United States Patent Office 3,642,918
Patented Feb. 15, 1972

3,642,918
PRODUCTION OF PERCHLOROETHYLENE
AND TRICHLOROETHYLENE UTILIZING
OXYCHLORINATION REACTION
Lester E. Bohl and Raymond M. Vancamp, New Martinsville, W. Va., assignors to PPG Industries, Inc., Pittsburgh, Pa.
No Drawing. Continuation of application Ser. No. 568,763, July 29, 1966, which is a continuation of application Ser. No. 258,131, Feb. 13, 1963. This application May 31, 1968, Ser. No. 733,317
Int. Cl. C07c 21/10, 21/12
U.S. Cl. 260—654 A                    4 Claims

ABSTRACT OF THE DISCLOSURE

Trichloroethylene and perchloroethylene are produced by oxychlorinating an aliphatic 2 carbon hydrocarbon or partially chlorinated hydroacrbon in a two-stage process. In the first stage, oxychlorination is conducted in a fluidized bed at 550° F. to 750° F. to give a chlorinated product of the composition $C_2H_xCl_y$, $x$ ranging from 1 to 3.3 and $y$ from 2.5 to 4. This oxychlorination product, along with further oxygen, is fed to a second fluidized bed operated at a higher temperature than the first bed between 700° F. to 830° F., wherein it is converted by oxidation reaction to a predominantly trichloroethylene and perchloroethylene product. Some chlorinating agent may be fed to the second fluidized bed as the chlorine content of the first stage product dictates.

This application is a continuation of our copending application Ser. No. 568,763, filed July 29, 1966, which is a continuation of our copending application Ser. No. 258,131, filed Feb. 13, 1963, both now abandoned.

The present invention relates to the production of perchloroethylene and trichloroethylene.

More particularly, the present invention relates to the production of perchloroethylene and trichloroethylene utilizing processes involving an oxychlorination reaction.

Still more particularly, the present invention relates to a two-stage process for the production of perchloroethylene and trichloroethylene which process is conducted in catalytic fluidized beds.

It is known in the art to prepare chlorinated hydrocarbons from aliphatic hydrocarbons and their incompletely chlorinated derivatives by modified Deacon type chlorination procedures. Thus, an oxychlorination procedure of this type conveniently involves the chlorination of the hydrocarbon and/or a chlorohydrocarbon with hydrogen chloride, an oxygen containing gas such as air, or elemental oxygen in the presence of a metal halide catalyst and at elevated temperatures. In a process of this nature, the hydrocarbon chloride is believed to be oxidized in the presence of the catalyst to chlorine and water, and the chlorine liberated in this manner from the hydrogen chloride reacts with the hydrocarbon or chlorinated hydrocarbon present in the feed gas to the reaction zone to form further chlorinated hydrocarbons and HCl. The HCl produced by this chlorination is then further utilized by being converted to chlorine in a Deacon reaction.

In another modification of the oxychlorination process contemplated herein, elemental chlorine is used as the feed source. In this latter type operation hydrogen chloride is generated by the chlorination of the hydrocarbon and/or hydrocarbon chloride fed with the elemental chlorine to the catalytic reaction zone. Thus, free chlorine, an oxygen containing gas, such as air, or oxygen itself, and a hydrocarbon and/or chlorohydrocarbon are passed in contact with a metal halide catalyst maintained at elevated temperatures. The chlorine presumably reacts with the hydrocarbon and/or chlorohydrocarbon to produce hydrogen chloride and a chlorinated derivative of the organic feed. The chlorine content of the hydrogen chloride produced in this manner is then utilized to achieve additional chlorinations by the standard Deacon type reaction in which the hydrogen chloride is oxidized to water and elemental chlorine.

The present invention is concerned with operations of the above described character which take place in fluidized beds of catalyst particles. In discussing fluidized bed in the specification and claims, it is to be understood that the term "fluidized bed" is employed in the broad sense. In conducting fluid bed processes, gaseous reactants of varying velocities are passed upwardly through a bed of finely divided, solid, catalyst containing particles. When a gas is passed through a bed of solid, particulate material, several different conditions may be established depending upon the gas velocities employed, the size and density of the particles used, and other similar considerations. Thus, if the gas velocity is low, the bed of solids remains static. As the gas velocity is increased in the bed, however, some of the particles become dynamically suspended in the upwardly rising gas stream. As a result, the bed height expands and a bed which is termed a "dynamic bed" established. If the gas velocity is still further increased, the particles all become suspended and the bed expands even further. Ultimately, the bed may assume a highly turbulent condition which in many ways resembles a boiling liquid. The present process may be applied to either dynamic beds or beds resembling the boiling liquid type and both beds are embraced by the term "fluidized bed" employed herein. The exact conditions requisite to establishing either of these bed conditions depends upon factors such as particle size (the bed components, gas velocities, density of the catalyst particles and other similar considerations. Wilhelm and Kwauk, Chemical Engineering Process, volume 44, page 201 (1948), equate the various factors necessary for fluidizing a bed and by following the principles therein discussed, the desired bed conditions may be provided for any given set of gases utilized or catalyst particles employed.

In conducting fluidized bed oxychlorination reactions as described above, considerable attention must be given to the reaction conditions prevailing during the processing of the feed materials to the ultimate final product. Thus, generally speaking high temperatures are employed in conducting oxychlorination reactions and because of the corrosive nature of the gases contained in the reactors themselves, considerable corrosion may take place unless a careful control of operating conditions is maintained. In addition, excessive temperature rises occurring within the oxychlorination reaction zones, give rise to considerable burning of the organic feed materials, thereby seriously limiting the percent conversion of the feed materials to desired product. In conducting an oxychlorination reaction for the production of trichloroethylene and perchloroethylene, for example, high temperatures are generally employed, that is, temperatures greater than 750° F. in order to achieve a satisfactory production level of trichloroethylene and perchloroethylene. It is found in these operations that undesirable quantities of saturated hydrocarbon chlorides are produced which lead to serious distillation problems. To avoid this, recourse to even higher temperatures is customary. Because of these high temperatures, and the corrosive nature of the gases occurring within the reaction zones, serious corrosion of reactor walls often takes place as a consequence. In addition, excessive burning of the feed material also occurs, which gives rise to lower utilizations than expected.

It has now been found in accordance with the present invention, that many of the difficulties occurring in the prior art oxychlorination procedures involving the oxychlorination of hydrocarbons and/or chlorohydrocarbons to provide a trichloroethylene-perchloroethylene product stream, may be avoided by recourse to a two-stage operation. Essentially in conducting the two-stage oxychlorination reaction, a first stage oxychlorination reaction is conducted at lower than normal operating temperatures for the production of trichloroethylene and perchloroethylene. In the operation of this first stage oxychlorination reaction, a reduction in the quantity of chlorinating agent normally fed to produce trichloroethylene and perchloroethylene may take place and the reaction zone is operated at relatively low temperatures.

Thus, in accordance with the teachings of the present invention an oxychlorination reaction is conducted in a first stage reaction zone to provide a chlorinated organic product which contains a mixture of hydrocarbon chlorides, which mixture has an average formula of $C_2H_xCl_y$. In actual operation, the oxychlorination reaction is conducted on the basis of the atoms of chlorine fed in the chlorinating agent and that chlorine present in the organic feed to provide a composition which has an average composition of $C_2H_xCl_y$, where $x$ is a numerical value ranging between 1 and 2.8 and $y$ is a numerical value ranging between 3 and 4.

While in the preferred embodiment of the instant invention only oxygen is fed to the mixture produced in the first stage reaction zone to convert the chlorinated hydrocarbon stream produced therein to perchloroethylene and trichloroethylene, it is of course permissable to operate the second stage reaction zone with small quantities of chlorinating agent being fed thereto. When small quantities of a chlorinating agent are contemplated for use in the second reaction zone of the instant process, the average mean composition produced in the first stage is again $C_2H_xCl_y$, with $x$ representing a numerical value between 1.5 to 3.3 and $y$ representing a numerical value between 2.5 and 3.5. These values are easily attained by adjustment of the organic to chlorinating agent molar feed ratios for the particular organic fed to the oxychlorination reaction zone. Thus, the precise composition of the mixture of chlorinated hydrocarbons which is made in the first reaction zone will be determined in part by whether or not it is desired to feed a chlorinating agent to the second reaction zone.

The product stream from the first stage reaction zone is typically passed into a second stage oxychlorination reaction in which considerable quantities of oxygen are fed and if desired with relatively small quantities of a chlorinating agent being added. As will be obvious because of the high chlorine content of the feed material, very little chlorine is normally required to provide the sufficient chlorine to take the feed composition of the second stage reaction to a perchloroethylene-trichloroethylene product stream in the second stage. Thus, the second stage of the reaction is primarily an oxidation reaction. This second stage, however, may contain additional small quantities of halides such as HCl or $Cl_2$ where additional chlorine is required to produce a given hydrocarbon chloride product. In addition, a total oxidation reaction occurring in the second stage permits operations with considerably lower temperatures in the second stage of the reaction system while the first stage operation may also be conducted at a temperature considerably below those normally encountered in an oxychlorination reaction designed to produce trichloroethylene and perchloroethylene.

The oxygen fed to the second stage should be fed in sufficient quantity to convert the hydrogen present to water and leave a reaction product having the desired chemical composition. For example, where a 1 to 1 weight ratio of trichloroethylene and perchloroethylene is desired in the second stage and the average crude fed to that stage has a composition of $C_2H_{2.44}Cl_{3.10}$, 0.5 mole of oxygen will produce the desired perchlor-trichlor ratio by removing the necessary quantity of hydrogen atoms from the feed. If HCl was added to the second stage in this example, it will of course be understood by the skilled art that additional oxygen to convert the hydrogen atoms of the HCl to water will be required. The organic feed to the second reactor is of course composed primarily of product from the first reactor. In conducting the second stage reaction, however, materials other than product are formed and these may be used as feed to the second stage reactor by recycling them and combining them with the product stream from the reactor. Whether the product stream of the first reaction zone is used alone as feed to the second reactor or is used in combination with the recycled material, recourse will still be had to provide in the second stage reactor a feed having the composition hereinabove set forth.

In conducting an oxychlorination reaction in accordance with this invention, therefore, suitable feed materials such as ethylene dichloride, a chlorinating agent such as HCl or chlorine and oxygen as elemental oxygen or air is introduced into a first stage oxychlorination reactor, operating at a temperature of between 550° F. to 750° F. The feed ratio of ethylene dichloride to HCl to oxygen is regulated to provide sufficient chlorine by virtue of HCl to upgrade ethylene dichloride feed material to a feed composition containing approximately 3.2 chlorine atoms therein. The oxygen requirements are sufficient to provide the necessary oxygen to absorb the hydrogens lost during the oxychlorination reaction and produce water. The product gases issuing from the first stage reactor are then introduced into a second stage reactor in which considerable quantities of oxygen are fed thereto. Since the desired composition in the second stage reaction is perchloroethylene and trichloroethylene sufficient oxygen must be supplied to satisfactorily tie up the hydrogens lost during the reaction and to convert any HCl present to elemental chlorine and water. The second stage reaction is operated at a considerably higher temperature than the first, and normally this operation takes place at temperatures ranging between 700° F. to 830° F.

Operating in this manner, satisfactory yields of trichloroethylene and perchloroethylene are obtained from an ethylene dichloride feed to a first stage reactor followed by an oxidation of the products of the first stage reaction with a minimum quantity of burning occurring.

In conducting oxychlorination reactions in accordance with the teachings of this invention, metal halide catalysts are generally employed and are impregnated on a suitable carrier material. A particularly effective catalyst for use in the oxychlorination reactions conducted herein is a cupric chloride-potassium chloride catalyst impregnated on a Florex carrier. While this particular catalyst forms a preferred embodiment of the invention, it is of course to be understood that other oxychlorination catalysts may be employed. Thus, the catalysts employed for the oxychlorination reactions described herein may conveniently comprise any of the well known oxychlorination or Deacon type reaction catalysts impregnated on a suitable carrier or support. Catalysts of the type normally employed in any oxychlorination reaction are metal halides, preferably chlorides of multivalent metal, such as copper, iron and the like. These materials may be utilized alone or may be combined with other metals such as alkali metal chlorides, alkaline earth metal chlorides or mixtures thereof. Generally speaking, any effective Deacon type metal halide catalyst will produce chlorinated hydrocarbons and the desired perchloroethylene and trichloroethylene products of the instant invention from the reactants fed to the oxychlorination reaction zone.

The selection of the particular carrier for the metal halides or chlorides to be employed will depend in great measure upon the type of process contemplated, that is, whether operations are conducted in a fixed bed or fluid bed. Typical carrier materials which are employed in oxychlorination reactions of the type described herein are silica, alumina, fuller's earth, kieselguhr, or other like materials. In conducting the reactions of the instant invention, it has been found that calcined fuller's earth and calcined diatomaceous earth form the preferred carrier materials for utilization in this process.

In operating a two-stage process in accordance with the instant invention, temperature conditions are controlled within certain prescribed limits in each of the reaction zones to provide for maximum productivity. In the first stage reaction, where the feed gas for the perchloroethylene-trichloroethylene reaction is formed, temperature conditions are maintained so that the temperature never falls below 550° F. and never exceeds 750° F. In the second stage reaction, that is, the reaction in which the chlorinated hydrocarbons recovered from the first stage are taken to trichloroethylene and perchloroethylene, temperature conditions range broadly between 700° F. and 830° F. Preferably, the first stage reaction is operated at about 700° F. and the second stage reaction at about 775° F.

The reactors of the instant invention may be operated at atmospheric pressures if desired, but recourse to the utilization of superatmospheric pressures is also practiced. Generally, reactors are operated under slight conditions of pressure and the limitations on the pressure conditions will depend on the ability of the equipment to remove heat and to withstand elevated pressures. Typically, pressures ranging between 5 and 45 lbs. per square inch gauge are employed during the oxychlorination and the subsequent oxidation reaction in accordance with the teachings herein described.

In conducting the operation of the oxychlorination reaction and the second stage oxidation reaction, considerable attention should be given to the removal of heat from the zones. In both stages of operation considerable heat is evolved due to the exothermic nature of the reactions conducted in each of these zones. Thus, it is advisable in conducting these reactions to provide heat exchange equipment either in the reaction zone itself or in jackets surrounding the reactors or to utilize a combination of both these forms of heat exchange. Generally, cooling coils located in the reactor beds themselves provide sufficient cooling surface to maintain temperatures within the desired limitations. In addition, cooling coils have been found helpful in distributing gases and solid particles within a fluidized bed reactor much in the way baffles are employed for this purpose. A particularly effective method of cooling reactors in accordance with the teachings of this invention is to supply cooling coils internally and to also surround the reactor with a jacket. Operating two cooling surfaces of this type during the reaction gives rise to a relatively easy control of reactor temperatures so that the temperatures may be maintained within the prescribed limits.

For a more complete understanding of the present invention, reference is made to the following examples which are illustrative of several modes of conducting the process in accordance with the teachings herein described.

EXAMPLE I

A nickel reactor 15 inches in diameter is employed as a fluid bed reactor. The reactor is enclosed in a 20 inch diameter steel jacket forming an annular heat exchange system around the reactor. "Dowtherm" (a diphenyl-diphenyl oxide eutectic) is used in the jacket to heat or cool the fluid bed contained in the reactor. An 8 inch diameter nickel internal cyclone is located at the top of the reactor in a 20 inch diameter by 18 inch high expanded section located above the jacketed portion. Located in the bottom of the reactor is a nickel distributor plate having a plurality of drilled holes therein. Below the distributor plate is a chamber or wind box closed at the bottom and sides and serving as an introduction chamber for two of the reactant feed gases, the organic feed and the chlorinating agent. The chlorinating agent and organic feed gases introduced into the reactor passes from the chamber through the drilled holes of the distributor plate to the reactor proper. Located 8 inches above the distributor plate is a ½ inch internal diameter nickel ring having a plurality of holes drilled in the top and sides. Oxygen is introduced through a ½ inch internal diameter pipe to this ring and up into the bed. The reactor is filled to a depth of 6 feet with catalyst particles prepared as follows. One hundred pounds of Florex (a calcined fuller's earth) of 30 to 60 mesh size (U.S. Sieve Series) is placed in a fluidized bed reactor 10 inches in diameter and fabricated of nickel. A solution is prepared by dissolving 29 pounds of $CuCl_2 \cdot 2H_2O$ and 15.2 pounds of KCl in 15 gallons of water. The Florex particles are fluidized with hot air at a temperature of about 220° F. and the solution of copper chloride and potassium chloride is added to the fluidizing Florex particles in dropwise fashion until the entire solution has been added. The finished catalyst has a copper content of 7.5 percent and a potassium content of 5.5 percent based on the total weight of the carrier. Two gas feed lines are provided for the introduction of the organic feed and the chlorinating agent into the reactor wind box. A cooling coil consisting of 36 feet of ½ inch nickel pipe is located in the reactor fluid bed and water under pressure of 30 pounds per square inch gauge is circulated through the coil to remove a portion of the heat generated from the reaction taking place in the catalyst bed. Utilizing this apparatus, ethylene dichloride, $Cl_2$ and oxygen are fed to the reactor. The molar feed ratio of the reactant gases, the velocities and the temperatures maintained in the reactor are set forth below in Table I.

A second reactor identical to the one described above but not having a ring in the fluid bed is used for the second stage. The first stage products are condensed, vaporized and admitted to the second reactor via a gas line connected to the wind box. Oxygen is also added to the wind box in the ratios indicated in Table I below. Both reactors are run to provide a perchloroethylene-trichloroethylene product in the final reactor. The results of both of these runs are set forth below in Table I.

TABLE I

|  | 1st stage | 2d stage |
|---|---|---|
| EDC*: $Cl_2$:$O_2$ (mole ratio) | 1.0:0:58.0.68 | 1.0:0.0:0.37 |
| Reactor pressure (p.s.i.g.) | 0 | 0 |
| Bed height (fluidized), ft | 8 | 8 |
| Bed temp., °F | 691 | 775 |
| Velocity (ft. per sec.) | 0.54 | 0.54 |
| Mole percent ECD* converetd to chlorinated organics. | 94·3 |  |
| Mole percent 1st stage product converted to chlorinated organics. |  | 91.3 |
| Percent $Cl_2$ converted to chlorinated organics. | 91.5 |  |
| Avg. organic composition | $C_2H_{2.1}Cl_{3.3}$ |  |
| Crude organic composition, wt. percent | | |
| $C_2H_3Cl$ | 0.4 | 0.1 |
| $C_2H_2Cl_2$ | 2.2 | 4.1 |
| 1,2-$C_2H_4Cl_2$ | 11.4 | 0.0 |
| $C_2HCl_3$ | 13.1 | 41.4 |
| 1,1,2-$C_2H_3Cl_3$ | 18.5 | 0.4 |
| $C_2Cl_4$ | 14.1 | 44.5 |
| $C_2H_2Cl_4$ | 28.0 | 4.6 |
| $C_2HCl_5$ | 10.6 | 3.7 |
| $C_2Cl_6$ | 0.3 | 0.2 |
| $C_1$'s | 1.4 | 1.0 |

* Ethylene dichloride.

If desired, the second reactor may be connected directly to the vent gas stream of the first reactor through the wind box thus eliminating the condensing and vaporizing steps used in the example.

EXAMPLE II

A nickel reactor 13 feet in height and 15 inches in diameter is employed as a fluid bed reactor. The reactor is enclosed in a 20 inch diameter steel jacket forming an annular heat exchange system around the reactor. Dowtherm (a diphenyl-diphenyl oxide eutectic), is used in the jacket to heat or cool the fluid bed contained in the reactor. An 8 inch diameter nickel internal cyclone is located at the top of the reactor in a 20 inch diameter by 18 inch high expanded section located above the jacketed portion. Positions in the bottom of the reactor is a nickel distributor plate having a plurality of drilled holes therein. Below the distributor plate is a chamber of wind box, closed at the bottom and sides and serving as an introduction chamber for two of the reactant feed gases, the organic feed and the chlorinating agent. The chlorinating agent and the organic feed gases introduced into the wind box pass from this chamber through the drilled holes of the distributor plate to the reaction zone. Located 8 inches above the distributor plate is a ½ inch internal diameter nickel tubular ring having a plurality of drilled holes in the top and sides. Oxygen is introduced through a ½ inch nickel pipe connected to the ring and passes into the reactor bed through the holes drilled in the ring.

The reactor is filled to a depth of 6 feet with catalyst particles prepared as follows. One hundred pounds of Florex (a calcined fuller's earth) of 30 to 60 mesh size (U.S. Sieve Series) is placed in a fluidized bed reactor 10 inches in diameter and fabricated of nickel. A solution is prepared by dissolving 29 pounds of $CuCl_2 \cdot 2H_2O$ and 15.2 pounds of KCl in 15 gallons of water. The Florex particles are fluidized with hot air at a temperature of about 220° F. and the solution of copper chloride and potassium chloride is added to the fluidizing Florex particles in dropwise fashion until the entire solution has been added. The finished catalyst has a copper content of 7.5 percent and a potassium content of 5.5 percent based on the total weight of the carrier.

Two gas feed lines are provided for the introduction of the organic feed and the chlorinating agent into the reactor wind box. A cooling coil consisting of 36 feet of ½ inch internal diameter nickel pipe is located in the reactor fluid bed and water under pressure of 30 pounds per square inch gauge is circulated through the coil to remove a portion of the heat generated from the reaction taking place in the catalyst bed. Utilizing this apparatus, ethylene, dichloride, HCl and oxygen are fed to the reactor. The molar feed ratio of the reactant gases, the velocities and the temperatures maintained in the reactor set forth below in Table II.

TABLE II

| | |
|---|---|
| EDC [1]:HCl:$O_2$ (mole ratio) | 1.0:0.87:0.91 |
| Reactor pressure (p.s.i.g.) | 15 |
| Bed height (fluidized) | 10' |
| Bed temp., ° F. | 684 |
| Velocity (ft. per sec.) | 0.58 |
| Mole percent EDC [1] converted to chlorinated organics | 92.3 |
| Percent HCl converted to chlorinated organics | 84.1 |
| Avg. organic composition | $C_2H_{2.44}Cl_{3.10}$ |

Crude organic composition wt. percent

| | |
|---|---|
| $C_2H_3Cl$ | 0.32 |
| $C_2H_2Cl_2$ | 2.31 |
| 1,2-$C_2H_4Cl_2$ | 21.96 |
| $C_2HCl_3$ | 9.6 |
| 1,1,2-$C_2H_3Cl_3$ | 19.24 |
| $C_2Cl_4$ | 11.76 |
| $C_2H_2Cl_4$ | 23.67 |
| $C_2HCl_5$ | 9.08 |
| $C_2Cl_6$ | 0.28 |
| $C_1$'s | 1.79 |

[1] Ethylene dichloride.

A second reactor identical to the first is used to conduct the oxidation reaction. The condensed gases from the initial reactor are vaporized (crude composition of Table II) and passed into the second reactor. Oxygen is added to the reactor to provide 0.5 mole of $O_2$ per mole of crude organic fed. The temperature of the reactor is maintained at 780° F. A condensed product stream containing 85 percent by weight perchloroethylene and trichloroethylene is obtained.

EXAMPLE III

Utilizing the equipment and catalyst of Example II, ethane, HCl and oxygen are fed to the first stage reactor to prepare a chlorinated organic feed for feeding to the second stage. The ratio of feed components, pressures, temperatures, gas velocities and results obtained are shown below in Table III.

The crude composition obtained in Table III is fed to the second reactor. Oxygen is added to the second reactor in an amount sufficient to provide 0.5 mole of oxygen per mole of organic fed and the reactor is maintained at a temperature of 780° F. The product from the second reactor is a mixture of chlorinated organics containing 85 percent perchloroethylene and trichloroethylene.

TABLE III

| | |
|---|---|
| Ethane:HCl:$O_2$ (mole ratio) | 1.0:2.24:1.87 |
| Reactor pressure (p.s.i.g.) | 10 |
| Bed height (fluidized) | 10' |
| Bed temp. ° F. | 700 |
| Velocity (ft. per sec.) | 0.6 |
| Mole percent ethane converted to chlorinated organics | 71.4 |
| Percent HCl converted to chlorinated organics | 93.2 |
| Avg. organic composition | $C_2H_{2.58}Cl_{2.88}$ |

Crude organic composition wt. percent

| | |
|---|---|
| $C_2H_3Cl$ | 1.16 |
| $C_2H_5Cl$ | 5.96 |
| $C_2H_2Cl_2$ | 4.40 |
| 1,1-$C_2H_4Cl_2$ | 0.16 |
| 1,2-$C_2H_4Cl_2$ | 14.21 |
| $C_2HCl_3$ | 13.51 |
| $C_2H_3Cl_3$ | 16.25 |
| $C_2Cl_4$ | 8.74 |
| $C_2H_2Cl_4$ | 26.65 |
| $C_2HCl_5$ | 4.73 |
| $C_2Cl_6$ | 0.05 |
| $C_1$'s | 3.82 |
| $C_3$'s | 0.36 |

EXAMPLE IV

Utilizing the equipment and catalyst of Example II, ethylene, HCl and oxygen were fed to the first stage reactor to prepare a chlorinated organic feed for feeding to the second stage. The ratio of feed components, pressures, temperatures, gas velocities and results obtained are shown below in Table IV.

The crude composition obtained in Table IV is fed to the second reactor. Oxygen is added to the second reaction in an amount sufficient to provide 0.5 mole of oxygen per mole of organic fed and the reaction is maintained at a temperature of 780° F. The product from the second reactor is a mixture of chlorinated organics containing 85 percent perchloroethylene and trichloroethylene.

TABLE IV

| | |
|---|---|
| Ethylene:HCl:$O_2$ (mole ratio) | 1.0:2.83:1.65 |
| Reactor pressure (p.s.i.g.) | 10–20 |
| Bed height (fluidized) | 10' |
| Bed temp. ° F. | 690 |
| Velocity (ft. per sec.) | 0.6 |
| Mole percent ethylene converted to chlorinated organics | 87.7 |
| Percent HCl converted to chlorinated organics | 96.8 |
| Avg. organic composition | $C_2H_{2.40}Cl_{3.13}$ |

Crude organic composition wt. percent

| | |
|---|---|
| $C_2H_3Cl$ | 0.2 |
| $C_2H_2Cl_2$ | 2.5 |
| 1,2–$C_2H_4Cl_2$ | 21.6 |
| $C_2HCl_3$ | 10.0 |
| 1,1,2–$C_2H_3Cl_3$ | 17.5 |
| $C_2Cl_4$ | 11.9 |
| $C_2H_2Cl_4$ | 25.2 |
| $C_2HCl_5$ | 8.8 |
| $C_2Cl_6$ | 0.2 |
| $C_1$'s | 2.1 |

EXAMPLE V

The apparatus as described in Example II is employed to conduct a two stage reaction to produce perchloroethylene and trichloroethylene from ethylene dichloride, HCl and oxygen. An apparatus identical to that in Example II is used as the second stage reactor and a chlorinating agent is introduced with the organic feed.

Using this equipment, ethylene dichloride, HCl and oxygen are fed to the first stage in a molar feed ratio of 1 to 0.87 to 0.91. The temperature of the reactor is maintained at 690° F. The crude organic composition obtained has an average formula of $C_2H_{2.4}Cl_{3.1}$. This organic crude composition is fed to the second stage reactor with oxygen and HCl. The molar feed ratio of crude organic to oxygen to HCl is 1 to 0.65 to 0.31 and the temperature is maintained at 780° F. Utilizing this procedure a predominantly trichloroethylene-perchloroethylene product stream is readily obtained.

EXAMPLE VI

The apparatus as described in Example II is utilized to conduct a two stage reaction to produce perchloroethylene and trichloroethylene from ethylene dichloride, chlorine and oxygen. An apparatus identical to that in Example II is used as the second stage reactor and a chlorinating agent is introduced with the organic feed.

Using this modified equipment, ethylene dichloride, chlorine and oxygen are fed to the first stage reactor in a molar feed ratio of 1 to 0.46 to 0.54, ethylene dichloride to chlorine to oxygen. The temperature of the reactor is maintained at 690° F. The crude organic composition obtained has an average formula of $C_2H_{2.4}Cl_{3.1}$. This organic crude is fed to the second stage reactor with oxygen and $Cl_2$. The molar feed ratio of crude organic to oxygen to $Cl_2$ is 1 to 0.57 to 0.15 and the temperature of the second stage reactor is maintained at 780° F. Utilizing this procedure, a predominantly trichloroethylene-perchloroethylene product stream is readily obtained.

EXAMPLE VII

The apparatus as described in Example II is utilized to conduct a two stage reaction to produce perchloroethylene and trichloroethylene from ethane, HCl and oxygen. An apparatus identical to that in Example II is used as the second stage reactor and a chlorinating agent is introduced with the organic feed.

Using this modified equipment, ethane, HCl and oxygen are fed to the first stage reactor in a molar feed ratio of 1 to 2.24 to 1.87, ethane to HCl to oxygen. The temperature of the reactor is maintained at 700° F. The crude organic composition obtained has an average formula of $C_2H_{2.3}Cl_{3.1}$. This organic composition is fed to the second stage reactor with oxygen and HCl. The molar feed ratio of crude to oxygen to HCl is 1 to 0.65 to 0.31 and the temperature of the second stage reactor is maintained at 780° F. Utilizing this procedure a product stream of predominantly trichloroethylene and perchloroethylene is obtained.

EXAMPLE VIII

The apparatus as described in Example II is utilized to conduct a two-stage reaction to produce perchloroethylene and trichloroethylene from ethylene, HCl and oxygen. An apparatus identical to that in Example II is used as the second-stage reactor and a chlorinating agent is introduced with the organic feed.

Using this modified equipment, ethylene, HCl and oxygen are fed to the first-stage reactor in a molar feed ratio of 1 to 2.83 to 1.65, ethylene to HCl to oxygen. The temperature of the reactor is maintained at 690° F. The crude organic composition obtained has an average formula of $C_2H_{2.4}Cl_{3.17}$. This organic composition is fed to the second-stage reactor with oxygen and HCl. The molar feed ratio of crude to oxygen to HCl is 1 to 0.65 to 0.31 and the temperature of the second-stage reactor is maintained at 780° F. Utilizing these procedures a product stream of predominantly trichloroethylene and perchloroethylene is obtained. As illustrated by the examples, the organic product mixture of the first-stage oxychlorination is lean in trichloroethylene and perchloroethylene.

While the invention has been described with reference to specific examples and embodiments, it is of course to be understood that the invention is not to be thereby limited except insofar as appears in the accompanying claims.

What is claimed is:

1. A process for the chlorination of aliphatic hydrocarbons containing two carbon atoms and their incompletely chlorinated derivatives to produce perchloroethylene and trichloroethylene comprising feeding as gases the material to be chlorinated, oxygen, and a chlorinating agent selected from the group consisting of HCl, $Cl_2$ and mixtures of HCl and $Cl_2$ to a first fluidized bed of metal halide oxychlorination containing catalyst particles and effecting catalytic oxychlorination reaction therein, maintaining the temperature of said first bed lower than normal for the production of trichloroethylene and perchloroethylene between about 550° F. and 750° F., regulating the feed ratio of said gases fed to said first bed so that chlorine in the feed is in an amount to provide an organic product mixture of chlorinated $C_2$ hydrocarbons lean in trichloroethylene and perchloroethylene having an average composition corresponding to the formula $C_2H_xCl_y$ wherein $x$ is a numerical value ranging between 1 and 2.8 and $y$ is a numerical value ranging between 3 and 4, the amount of oxygen so fed being sufficient to absorb the hydrogens lost during the oxychlorination reaction in the first bed and produce water, removing the organic product mixture from the first bed and feeding it and further oxygen as gases to a second fluidized bed of metal halide containing catalyst particles without feeding further chlorinating agent thereto and effecting catalytic oxidation reaction therein, maintaining the temperature of the second bed considerably higher than that of the first bed between about 700° F. and about 830° F., controlling the gas feed ratio of said organic product mixture and said additional oxygen to the second bed to effect therein removal of hydrogen atoms from the said organic product mixture and provide a product from the second bed of an enriched trichloroethylene-perchloroethylene content containing predominantly perchloroethylene.

2. A process for chlorination of aliphatic hydrocarbons containing two carbon atoms and their incompletely chlorinated derivatives to produce perchloroethylene and trichloroethylene comprising feeding as gases the material to be chlorinated, oxygen, and a chlorinating agent selected from the group consisting of HCl, $Cl_2$, and mixtures of HCl and $Cl_2$ to a first fluidized bed of metal halide oxychlorination containing catalyst particles and effecting catalytic oxychlorination reaction therein, maintaining the temperature of said first bed lower than normal for the production of trichloroethylene and perchloroethylene between about 550° F. and 750° F., regulating the feed ratio of said gases fed to said first bed so that chlorine in the feed is in an amount to provide an organic product mixture of chlorinated $C_2$ hydrocarbons lean in trichloroethylene and perchloroethylene having an average composition corresponding to the formula $C_2H_xCl_y$ wherein $x$ is a numerical value ranging between 1.5 and 3.3 and $y$ is a numerical value ranging between 2.5 and 3.5, the amount of oxygen so fed being sufficient to absorb the hydrogens lost during the oxychlorination reaction in the first bed and produce water, removing the organic product mixture from the first bed and feeding it and further oxygen and chlorinating agent as gases to a second fluidized bed of metal halide containing catalyst particles, maintaining the temperatures of the second bed considerably higher than that of the first bed between about 700° F. and about 830° F., controlling the gas feed ratio of said organic product mixture and said additional oxygen and additional chlorinating agent to the second bed to increase the chlorine content of said organic product mixture and remove hydrogen atoms from the said organic product mixture and provide a product from the second bed of an enriched trichloroethylene-perchloroethylene content containing predominantly perchloroethylene and trichloroethylene.

3. A process for the chlorination of aliphatic hydrocarbons containing two carbon atoms and their incompletely chlorinated derivatives to produce perchloroethylene and trichloroethylene comprising feeding as gases the material to be chlorinated, oxygen, and a chlorinating agent selected from the group consisting of HCl, $Cl_2$ and mixtures of HCl and $Cl_2$ to a first fluidized bed of metal halide oxychlorination containing catalyst particles and effecting catalytic oxychlorination reaction therein, maintaining the temperatures of said first bed lower than normal for the production of trichloroethylene and perchloroethylene between about 550° F. and 750° F., regulating the feed ratio of said gases fed to said first bed so that the chlorine in the feed is in an amount to provide an organic product mixture of chlorinated $C_2$ hydrocarbons lean in trichloroethylene and perchloroethylene having an average composition corresponding to the formula $C_2H_xCl_y$ wherein $x$ is a numerical value ranging between 1 and 2.8 and $y$ is a numerical value ranging between 3 and 4, the amount of oxygen so fed being sufficient to absorb the hydrogens lost during the oxychlorination reaction in the first bed and produce water, removing the gaseous product mixture from the first bed, and condensing chlorinated organic products therein vaporizing so condensed chlorinated organic products, feeding these vaporized chlorinated organic products and further oxygen as gases to the second fluidized bed of metal halide containing catalyst particles without feeding additional chlorinating agent and effecting catalytic oxidation reaction therein, maintaining the temperature of the second bed considerably higher than that of the first bed between about 700° F. and about 830° F., controlling the gas feed ratio of said organic product mixture and said additional oxygen to the second bed to effect therein removal of hydrogen atoms from the said organic product mixture and provide a product from the second bed of an enriched trichloroethylene-perchloroethylene content containing predominantly perchloroethylene and trichloroethylene.

4. The method of claim 3 wherein the material to be chlorinated is selected from the group consisting of ethane, ethylene and ethylene dichloride.

References Cited

UNITED STATES PATENTS

| | | | |
|---|---|---|---|
| 2,342,100 | 2/1944 | Cass | 260—654 |
| 2,951,103 | 8/1960 | Ellsworth et al. | 260—654 |
| 2,644,846 | 7/1953 | Johnson et al. | 260—659 |
| 2,952,714 | 9/1960 | Milam et al. | 260—662 |
| 3,190,931 | 6/1965 | Laine et al. | 260—659 |

FOREIGN PATENTS

| | | | |
|---|---|---|---|
| 1,285,024 | 1/1962 | France | 260—654 |

LEON ZITVER, Primary Examiner

J. A. BOSKA, Assistant Examiner

U.S. Cl. X.R.

260—638 R, 657 A

PO-1050
(5/69)

UNITED STATES PATENT OFFICE
CERTIFICATE OF CORRECTION

Patent No. 3,642,918        Dated February 15, 1972

Inventor(s) Lester E. Bohl and Raymond M. Vancamp

It is certified that error appears in the above-identified patent and that said Letters Patent are hereby corrected as shown below:

In Column 10, line 61, Claim I, at the end of the claim, "and trichloreethylene" is omitted.

Signed and sealed this 11th day of July 1972.

(SEAL)
Attest:

EDWARD M. FLETCHER, JR.       ROBERT GOTTSCHALK
Attesting Officer             Commissioner of Patents